United States Patent
Fee (10) Patent No.: US 8,649,642 B2
(45) Date of Patent: Feb. 11, 2014

(54) METHODS AND SYSTEMS FOR PREDICTING AN OPTICAL FIBER PERFORMANCE PARAMETER

(75) Inventor: John A. Fee, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 52 days.

(21) Appl. No.: 13/306,427

(22) Filed: Nov. 29, 2011

(65) Prior Publication Data

US 2012/0084057 A1 Apr. 5, 2012

Related U.S. Application Data

(60) Division of application No. 12/032,368, filed on Feb. 15, 2008, now Pat. No. 8,103,139, which is a continuation of application No. 11/741,827, filed on Apr. 30, 2007, now Pat. No. 7,340,148, which is a division of application No. 10/922,131, filed on Aug. 20, 2004, now Pat. No. 7,283,691.

(60) Provisional application No. 60/541,929, filed on Feb. 6, 2004.

(51) Int. Cl.
*G02B 6/26* (2006.01)
*G02B 6/42* (2006.01)

(52) U.S. Cl.
USPC ............... 385/27; 385/28; 385/100; 385/122; 356/73.1

(58) Field of Classification Search
USPC ................... 385/27, 28, 100, 122; 356/73.1
See application file for complete search history.

(56) References Cited

U.S. PATENT DOCUMENTS

| | | |
|---|---|---|
| 5,699,207 A | 12/1997 | Supino et al. |
| 5,708,500 A | 1/1998 | Anderson |
| 5,867,616 A | 2/1999 | Antos et al. |
| 6,704,100 B2 | 3/2004 | Sengupta et al. |
| 6,829,409 B2 | 12/2004 | Koch et al. |
| 7,013,085 B2 | 3/2006 | Galtarossa et al. |
| 7,106,979 B1 | 9/2006 | Taylor |
| 7,190,850 B2 | 3/2007 | Mimura et al. |
| 7,256,876 B1* | 8/2007 | Boroditsky et al. .......... 356/73.1 |
| 7,298,934 B2 | 11/2007 | Goto et al. |
| 7,414,711 B1* | 8/2008 | Boroditsky et al. .......... 356/73.1 |
| 2002/0122169 A1 | 9/2002 | Lee et al. |

OTHER PUBLICATIONS

"Optronics EYT Tutorials—How is fiber made?", http://www.optronics.gr/Tutorials/how_is_the_fiber_made.htm, printed on Jul. 6, 2004, 6 pp.

(Continued)

*Primary Examiner* — Charlie Peng
*Assistant Examiner* — Mary El Shammaa (57) ABSTRACT

A method for predicting an optical fiber performance parameter includes measuring N values for the optical fiber performance parameter at N stages during manufacture or installation of a first optical fiber, where N is an integer. A first set of correlation values is generated representing shifts in the measured optical fiber performance parameter values at the N stages. An installed value of the optical fiber performance parameter is estimated for a second optical fiber based on the first set of generated correlation values and at least one measured optical fiber performance parameter value associated with the second optical fiber.

20 Claims, 6 Drawing Sheets

(56) References Cited

OTHER PUBLICATIONS

"Polarization Mode Dispersion", Web ProForum Tutorials, http://www.iec,org, The International Engineering Consortium, printed on Aug. 18, 2004, 16 pp.

"Polarization-Mode Dispersion", Corning Cable Systems, AEN 48, Revision 2, www.corning.com/cablesystems, Dec. 10, 2002, 3 pp.

"Virtual Facilities Tour", http://www.fibercore.com, Fibercore Limited, printed on Jul. 6, 2004, 15 pp.

Audet, Francis, "PMD: The Interferometric Method", www.exfo.com, printed on Aug. 18, 2004, 4 pp.

Boroditsky, et al, "In-Service Measurements of Polarization-Mode Dispersion and Correlation to Bit-Error Rate", IEEE Photonics Technology Letters, vol. 15, No. 4, Apr. 2003, 3 pp.

Cutler, Jenny Cutler, "Fiber Optics Related Manufacturing Machine Design", Feb. 21, 2001, 23 pp.

Deragon, et al., "Measuring and Compensating for PMD in High-Speed Optical Networks", printed on Aug. 18, 2004, 6 pp.

Kondamuri, Pradeep K., "Characterization of Polarization-Mode Dispersion on Buried Standard Single-Mode Fibers", Lightwave Lab., ITTC, University of Kansas, printed on Aug. 18, 2004, 29 pp.

Laferriere, "Polarization mode dispersion requirements", www.acterna.com, Feb. 2002, 6 pp.

Sunnerud, et al., "Polarization-Mode Dispersion in High-Speed Fiber-Optic Transmission Systems", Journal of Lightwave Technology, vol. 20, No. 12, Dec. 2002, 16 pp.

Williams, et al., "Narrowband measurements of polarization-mode dispersion using the modulation phase shift technique", Symposium on Optical Fiber Measurements (SOFM 1998), Sep. 15-17, 1998, Boulder, CO, NIST Special Publication 930, pp. 23-26.

* cited by examiner

METHODS AND SYSTEMS FOR PREDICTING AN OPTICAL FIBER PERFORMANCE PARAMETER

CROSS-REFERENCE TO RELATED APPLICATIONS

The present application is a divisional of U.S. patent application Ser. No. 12/032,368, filed Feb. 15, 2008, which is a continuation of U.S. patent application Ser. No. 11/741,827, filed Apr. 30, 2007 (now U.S. Pat. No. 7,340,148), which is a divisional of U.S. patent application Ser. No. 10/922,131, filed Aug. 20, 2004 (now U.S. Pat. No. 7,283,691), which claims priority to U.S. Provisional Application No. 60/541,929, filed Feb. 6, 2004, the entirety of each is incorporated herein by reference.

FIELD OF THE INVENTION

Systems and methods consistent with principles of the invention relate generally to optical fiber cables and, more particularly, to controlling polarization mode dispersion (PMD) in optical fiber cables.

BACKGROUND OF THE INVENTION

With the explosion in communication via the Internet in recent years, there has been a corresponding increase in demand for high-speed bandwidth, such as that provided by optical fibers. In fiber optic communication systems, a fiber that carries optical signals contains asymmetries. These asymmetries result in the optical properties of the fiber not being the same in all directions. Thus, the fiber is birefringent, where the material displays two different indices of refraction. This fiber birefringence causes polarization mode dispersion (PMD).

PMD is measured like a vector quantity, where a differential group delay is the magnitude of the vector and the principal state of polarization (PSP) is the direction. There are two PSPs associated with PMD. The two PSPs propagate at slightly different velocities with the distribution of signal power varying with time.

PMD is a time varying stochastic effect. PMD varies in time with ambient temperature, fiber movement, and mechanical stress on the fibers. Compensating for PMD can be difficult because of the time varying nature and randomness of PMD.

PMD has been shown to be an impairment to the transmission of signals over telecommunication optical fiber at line rates of 10 Gbits/s or above over long distances. Though the problem originates in both optical components and the transmission fiber, the ongoing focus has been PMD reduction in the fiber.

Current processes enable designing and manufacturing optical transmission fiber with very low values of PMD. However, not all manufacturers have access to the intellectual property which is critical to successfully and consistently produce fiber with good PMD performance. Hence, the optical fiber market offers a wide spectrum of quality with little differentiation in specifications. A current challenge for optical cable manufacturers and installers is assessing the true PMD quality of the fiber based on information provided by the fiber manufacturer. In particular, a common question is what fiber/cable qualification procedure should be followed to assure good PMD performance in the installed system.

The traditional specifications on PMD have focused on the link design value (LDV) or maximum differential group delay (DGD-max). These metrics have an inherent weakness, however, of being virtually impossible for a customer to verify. It has become apparent that more information on PMD is required, specific to a customers' fiber order and cable type. Acquiring this information involves careful attention to measurement techniques and correlation of fibers as they move from draw towers through the final installed cable product.

Accordingly, there is a need in the art of optical fiber manufacturing and installation for a system which provides predictive PMD throughout the manufacturing and installation process.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide polarization mode dispersion control during optical fiber manufacturing. According to one implementation consistent with principles of the invention, measurements indicative of a value of the performance parameter is obtained at first and second moments in time. A correlation between the measurements is then determined. A value of the performance parameter at the second moment in time is then estimated based upon the measurement at the first moment in time in combination with the correlation.

Exemplary Fiber Manufacturing System

Figure 1:
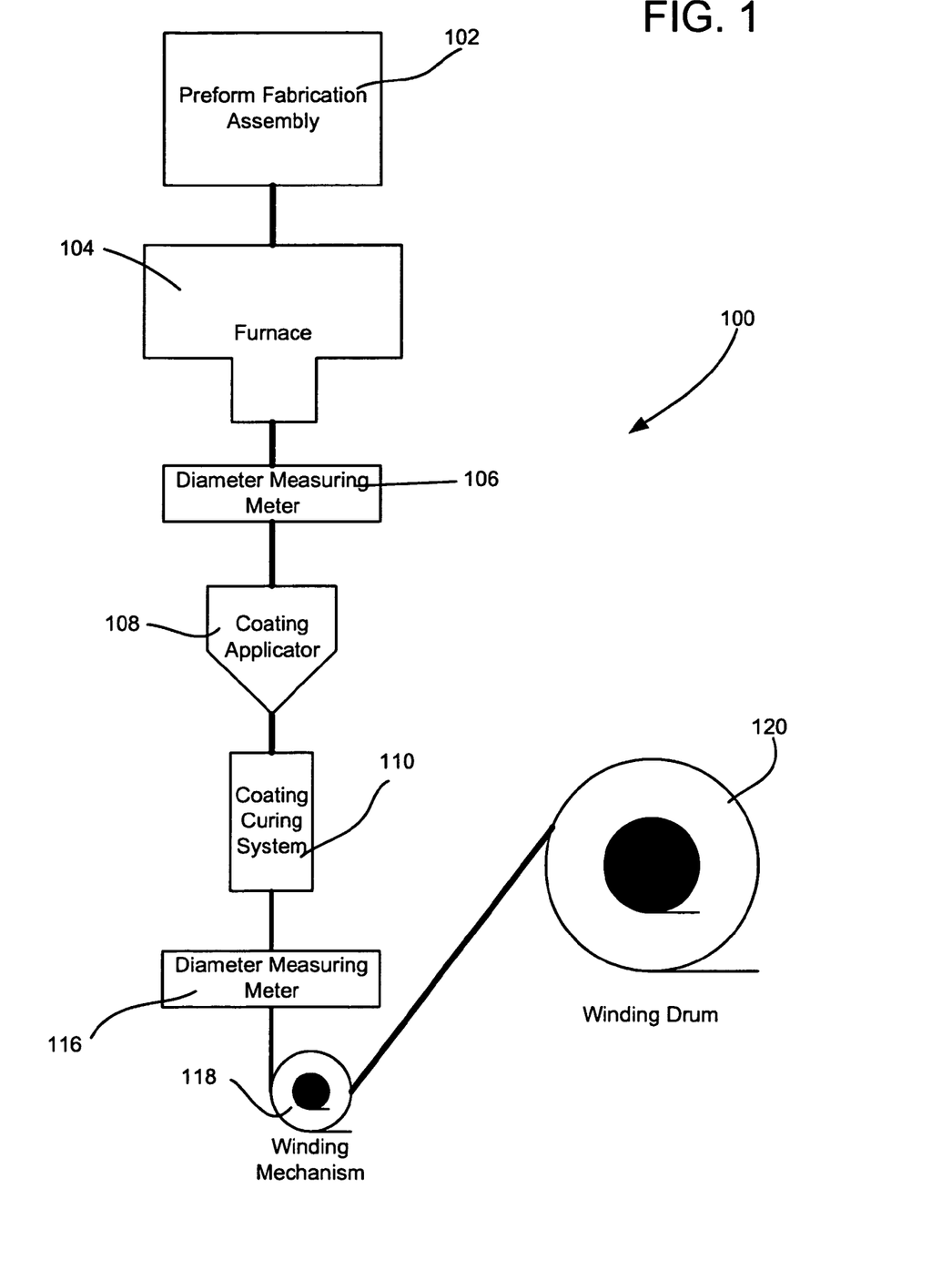
FIG. 1 is a block diagram of an exemplary fiber manufacturing system in which methods and systems consistent with the present invention may be implemented.

FIG. 1 is a block diagram of an exemplary fiber manufacturing system 100 in which methods and systems consistent with the present invention may be implemented. System 100 may include a preform fabrication assembly 102, a furnace 104, a diameter measuring meter 106, a coating applicator 108, a coating curing system 110, a second diameter measuring meter 116, a winding mechanism 118, and a winding drum 120.

Manufacture of optical fiber is a precise, highly technical and specialized process, resulting in fiber composed of two basic concentric glass structures: a core, which carries the light signals, and cladding, which traps the light in the core.

As illustrated in FIG. 1, there are three main steps in the process of converting raw materials into optical fiber ready to be shipped. Initially, preform fabrication assembly 102 may manufacture a pure glass preform. Next, winding mechanism 118 may draw the preform into a hair thin fiber through furnace 104, coating applicator 108, cured system 110, and the diameter measuring meters 106 and 116. Lastly, the fiber is taken up on a winding drum 120 for cutting and eventual shipping to cable manufacturers.

The first step in manufacturing glass optical fibers is to make the solid glass preform. There are several methods for forming preforms, such as Modified Chemical Vapor Deposition (MCVD), Plasma Modified Chemical Vapor Deposition (PMCVD), Plasma Chemical Vapor Deposition (PCVD), Outside Vapor Deposition (OVD), and Vapor-phase Axial Deposition (AVD). In MCVD, ultra-pure chemicals, such as primarily silicon tetrachloride ($SiC_4$) and germanium tetrachloride ($GeCl_4$), are burned in oxygen during preform manufacturing. Resulting oxides and silica are then sintered at high temperature. These chemicals are used in various types and proportions to fabricate the core regions for the different types of preforms and fibers.

The mixtures of chemicals described above are carried to the inside of a rotating glass starting tube made of pure synthetic $SiO_2$ (silica). The pure silica tube is mounted on a rotating lathe equipped with a special heat torch which traverses the length of the lathe at a predetermined speed and temperature. As the gasses flow inside the tube, they react to the heat by forming solid submicron particles, called "soot," as the torch passes. Once formed, the soot is deposited on the inner wall of the rotating tube. As the burner traverses over the deposited soot, the heat transforms the soot particles into pure, transparent glass, in a process called vitrification. The process is typically repeated for many hours as each subsequent core layer is formed. After the desired amount of core material has been deposited the chemical flow is eliminated. The speed of the torch may then be decreased and the temperature of the flame may be increased so that the tube collapses into a solid rod.

In accordance with principles of the invention, PMD for the preform is measured at the preform fabrication assembly 102. It should be understood that PMD may be measured in any suitable manner. Examples of measurement techniques include, but are not limited to, the Jones Matrix Eigenanalysis (JME) method, wavelength scanning, and the interferometric method. Each method results in a PMD or expected PMD value representing the delay between the two polarization orientations normalized over the length of the fiber or preform. The units of PMD are picoseconds (of delay) per root kilometer of length ($ps/\sqrt{km}$). Additionally, it should be understood that each PMD measurement typically includes a plurality of individual measurements, or samples, over a predetermined time period. A distribution or histogram of the measurements may be generated to identify a mean PMD value for the stage and to more accurately reflect the stage's sensitivity to PMD fluctuation. The distribution may them be analyzed to identify a particular stage's sensitivity or to identify process control issues resulting in unusual distributions.

As will be discussed in additional detail below, a determination is then made regarding whether the measured value of PMD meets or exceeds a predetermined specification or threshold. In one implementation, the threshold may be a confidence interval relating to the mean PMD value referenced above. If the preform's mean PMD falls outside of the determined threshold or confidence interval, the preform may be removed from manufacturing system 100 and analyzed to determine the reasons behind the deficient PMD value. In one implementation, a root cause analysis (RCA) is performed on the preform to determine the cause of the elevated PMD value. Another implementation would be the distribution of PMD along the perform length.

However, if the preform's mean PMD value falls within of the defined interval, the next step in the process of producing optical fibers is to convert the manufactured preform into a hair-thin fiber. This is done in an operation called fiber draw and typically is performed in a vertical tower utilizing gravity in the fiber draw process. Details regarding the specifics of the fiber draw process have been described above in relation to FIG. 1. In creating the fiber from the preform, the tip of the preform is lowered into a furnace 104. In one implementation, furnace 104 may be a high-purity graphite furnace. Pure gasses are injected into furnace 104 to provide a clean and conductive atmosphere. Furnace 104 is heated to temperatures approaching 1900° C. so as to soften the tip of the preform. Once the softening point of the preform tip is reached, gravity takes over and allows a molten gob to "free fall" until it has been stretched into a thin strand.

Once formed, the strand of fiber is measured by meter 106 and fed through a series of coating dies 108, 110, and the drawing process begins. The fiber is measured by meter 116, pulled by winding mechanism 118 situated at the bottom of the draw tower and then wound on winding drum 120. Typically, winding mechanism 118 operates at draw speeds of approximately 10-20 meters per second.

During the draw process the diameter of the drawn fiber is controlled to a predetermined diameter, for example 125 microns. A diameter gauge may be used to monitor the diameter of the fiber. In one implementation, the diameter gauge may be a laser-based micrometer. The actual value of the diameter may then be compared to the 125 micron target. Slight deviations from the target may be converted to changes in draw speeds and fed to the winding mechanism 118 for correction.

A two layer protective coating may be then applied to the fiber, such as a soft inner coating and a hard outer coating in coating applicator 108 and coating curing system 110. This two-part protective jacket provides mechanical protection for handling while also protecting the pristine surface of the fiber from harsh environments. Coating curing system 110 may use ultraviolet lamps to cure the coatings.

In accordance with principles of the invention, a PMD value is again measured at the drum stage. As will be discussed in additional detail below, a correlation between PMD values at the preform and drum stages may be determined indicating likely causes for poor PMD values.

Exemplary Processing

Figure 2:
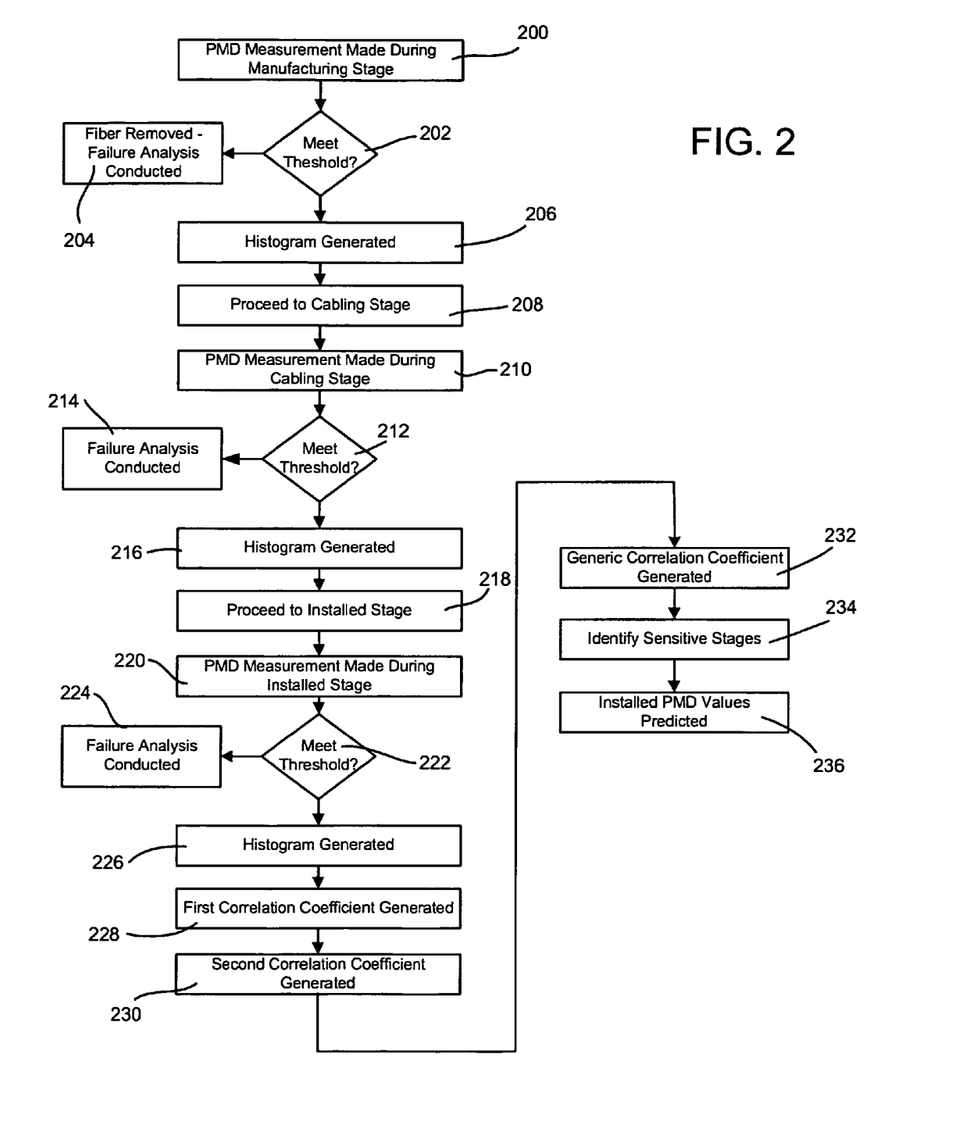
FIG. 2 is an exemplary flow diagram, consistent with the present invention, illustrating one method for providing PMD mapping and analysis through the entire fiber manufacture and installation process.

Once the fiber has been wound onto a winding drum it is ready for cutting, cabling and installation. In accordance with principles of the invention, PMD measurements throughout the manufacturing and installation process together enable accurate mapping of fiber PMD. FIG. 2 is an exemplary flow diagram, consistent with the present invention, illustrating one method for providing PMD mapping and analysis through the entire fiber manufacturing and installation process. Initially, a PMD measurement is made during the fiber manufacturing stage of an optical fiber manufacturing and installation process (act 200). In accordance with one implementation consistent with the invention, this measurement may be made following preform formation by preform fabrication assembly 102.

As discussed above, a PMD measurement may include measuring a plurality of samples and identifying a histogram or distribution and a mean PMD measurement of the stage. At this point, it is determined whether the measured PMD meets or exceeds a predetermined threshold or confidence interval (act 202). Another implementation would be the PMD shape of the histogram or distribution and its change over time. If the manufacturing stage PMD value does not meet or exceed the predetermined threshold, the manufactured fiber is removed from the manufacturing process and analyzed for failure causes (act 204). However, if the threshold is met, a histogram is generated relating to the measured PMD value(s) (act 206). The process may then continue to a cabling stage where the individual fibers are bundled together to form a cable (act 208).

Next, a cabling stage PMD measurement is made (act 210). At this point, it may be determined whether the measured PMD value meets or exceeds a predetermined threshold (act 212). It should be understood that the threshold of act 212 may differ from that of act 202 depending upon the expected PMD value. If the cabling stage PMD value does not meet or exceed the predetermined threshold, the fiber or cable is re-measured and/or analyzed to determine the cause for the failure (act 214). If the threshold is met, a histogram may be generated relating to the measured PMD value(s) (act 216). The process may then continue to an installed stage where the fiber cables are received in the field, spliced and installed (act 218).

An installed stage PMD measurement is made (act 220). It may then be determined whether the measured PMD value meets or exceeds a predetermined threshold (act 222). If the installed stage PMD value does not meet or exceed a predetermined threshold (which may again be different that than the thresholds of acts 202 and 212, above), the fiber or cable is re-measured and analyzed to determine the cause for the failure (act 224). If the threshold is met, a histogram may be generated relating to the measured PMD value(s) (act 226).

Once PMD measurements for at least two stages have been conducted for multiple fibers or cables, a correlation between the two stages may be identified. For example, in accordance with the present implementation, a correlation coefficient (r) may be identified between PMD measurements made during the manufacturing stage (act 200) and the PMD measurements made during the cabling stage (act 210) (act 228). This coefficient may indicate a predictable shift in PMD between the stages. Additionally, a second correlation coefficient may be identified between PMD measurements made during the cabling stage (act 210) and those made during the installed stage (act 220) (act 230).

In one implementation consistent with principles of the invention, the correlation coefficient is a Pearson Product Moment correlation coefficient, wherein a perfect positive correlation is denoted by a correlation coefficient of 1 and a perfect negative correlation is denoted by a correlation coefficient of −1. Additionally, a square of the correlation coefficient ($r^2$) provides a proportion of the variance of a measurement at one stage explained by the variance at a second stage. For example, a correlation coefficient of 0.8 ($r^2$=0.64) indicates that 64% of the variation in PMD measurements at a second stage can be explained by the variation in PMD measurements at the first stage. Although the Pearson correlation coefficient has been disclosed for exemplary purposes, it should be understood that any suitable correlation analysis may be conducted (e.g., Spearman correlation coefficient, etc.).

In addition to a correlation coefficient, data measured during the fiber manufacturing and installation process may also be reviewed using a regression analysis to generate an equation representing a linear relationship between measured PMD values. In one implementation consistent with principles of the invention, a linear regression may be performed identifying an equation having the form y=mx+b, where m is the slope of the identified line, and b is the intercept (the point where the line crosses the y axis). For this equation, the relative PMD measurements for a second stage may be predicted from a measurement at a first stage. Analysis of this line may indicate changes in the manufacturing process or environment as well as sensitivity to PMD fluctuations. Included in this equation might be a "goodness of fit" which could be used as a measure of the "scatter" of PMD points on the line. If the scatter is too large, the manufacturing process might be re-examined for RCA.

In one implementation consistent with principles of the invention, correlation coefficients between various stages may then be then combined to generate a generic correlation coefficient for the entire process (act 232). Once an initial set of correlation coefficients and/or regression equations has been identified, an analysis of the coefficients may be conducted to determine which stages most sensitively impact the PMD of installed fibers (act 234). In accordance with an implementation of the invention, this may be done by analyzing the correlation coefficients, regression equations and histograms generated above. In this manner, subsequent measurements of PMD values may be restricted to the identified stage or stages. This enhances the efficiency of the overall process. Once the sensitive stages and their respective correlation coefficients have been identified, installed PMD values may be predicted for fibers/cables throughout the manufacturing/installation process (act 236). In one implementation consistent with principles of the invention, installed PMD values may be predicted using a linear equation or a set of linear equations generated based upon sample measurements from at least two stages, in the manner described above. Another enhancement might be a 3 dimensional graph or plot using 3 different stages of manufacture to show changes in shape amongst the 3 different sensitive stages.

By measuring PMD values at a sensitive stage or group of stages, correlations between the measurements may be made and used to more accurately predict which cables will perform within specifications when installed in the field from an earlier stage of manufacture/installation.

Figure 3A:
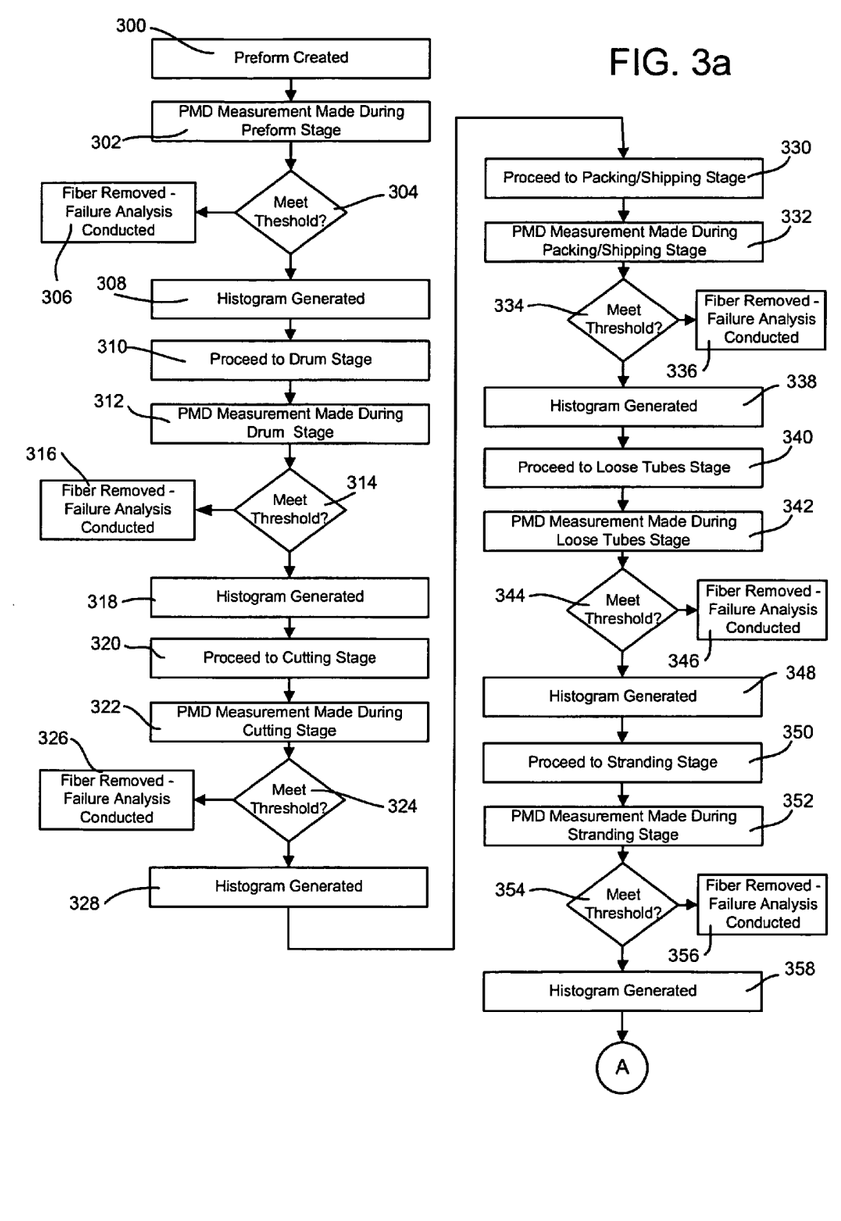
FIGS. 3a, 3b, and 3c are exemplary flow diagrams, consistent with the present invention, illustrating another method for providing PMD mapping and analysis through the entire fiber manufacture and installation process.
Figure 3B:
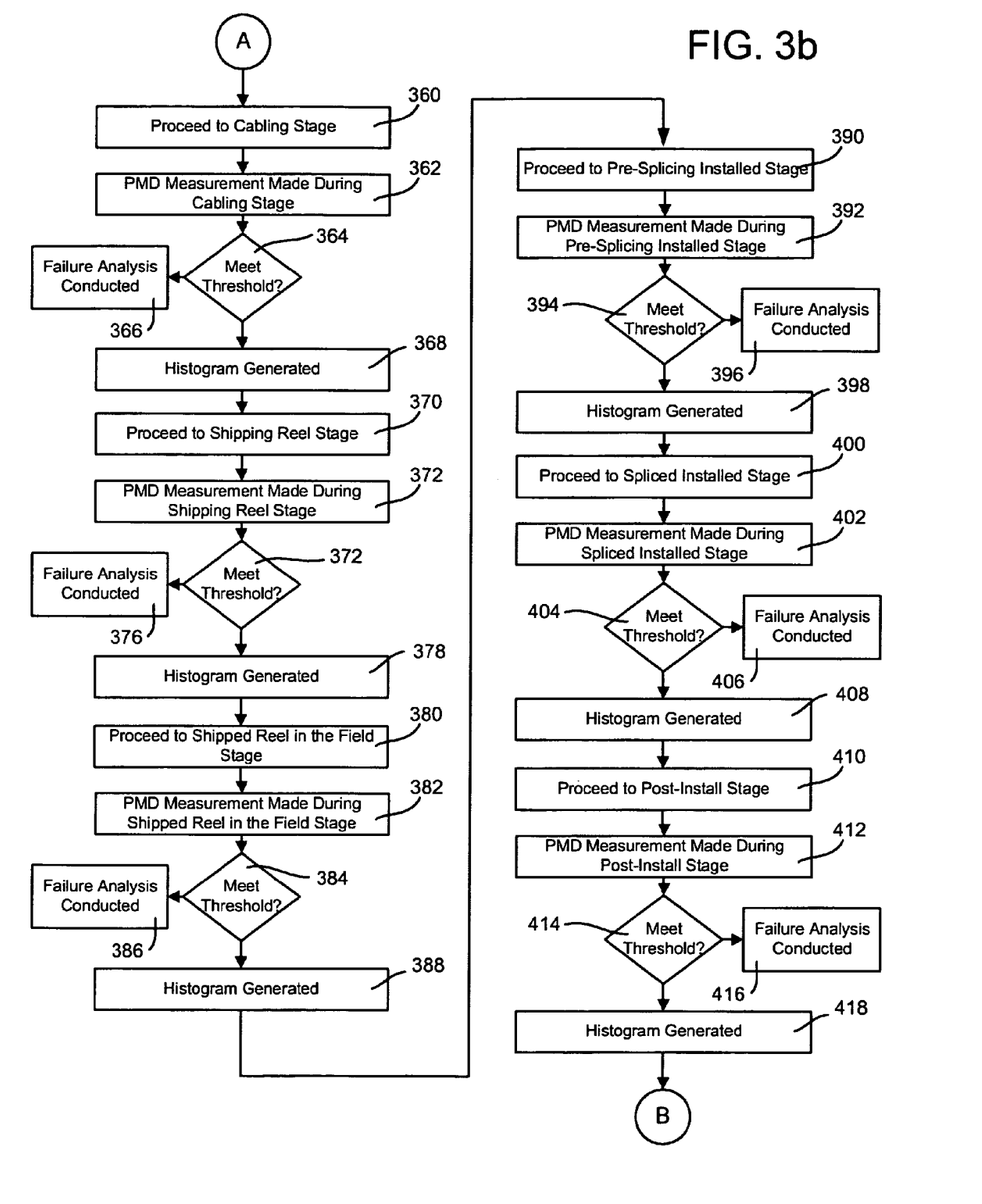
Figure 3C:
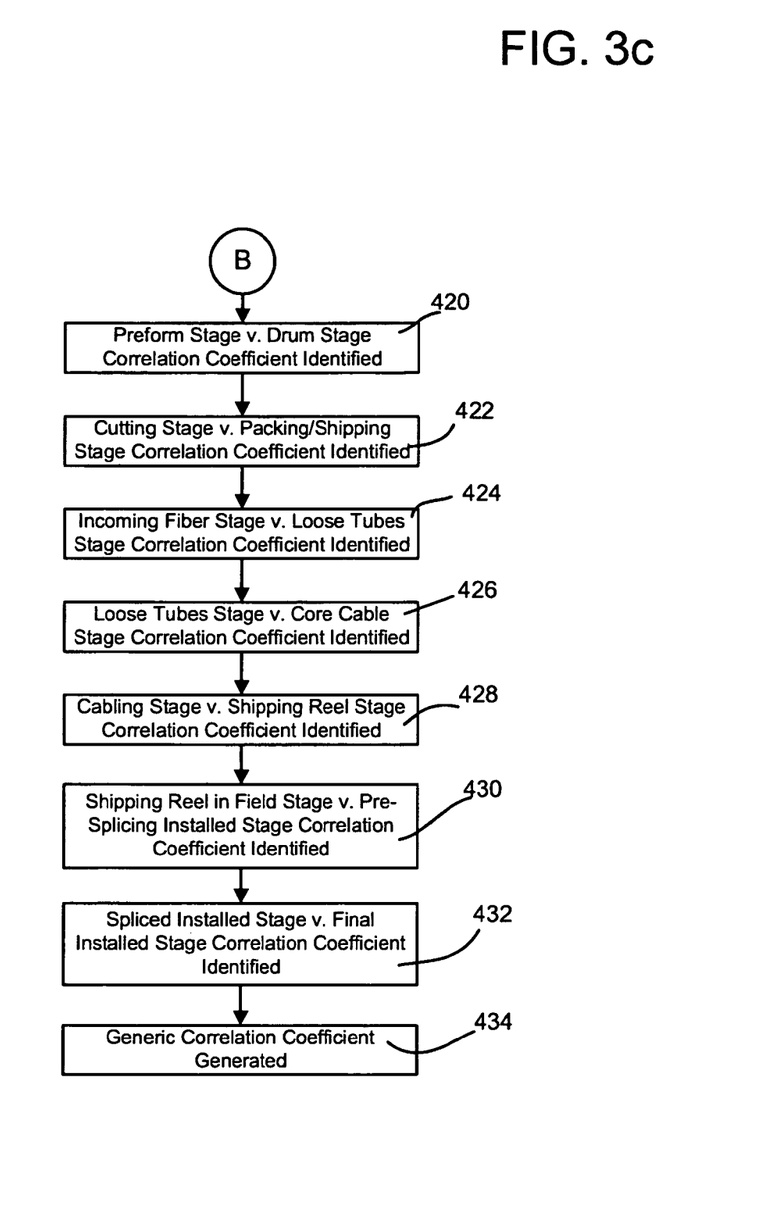

FIGS. 3*a*, 3*b* and 3*c* are exemplary flow diagrams, consistent with the present invention, illustrating another method for providing PMD mapping and analysis through the entire fiber manufacturing and installation process.

As described above, optical fiber manufacturing begins with the creation of an initial fiber preform (act 300) (FIG. 3*a*). Following preform creation, a PMD measurement may be made using any suitable method, examples of which are provided above (act 302). At this point, it is determined whether the measured PMD meets or exceeds a predetermined threshold (act 304). If the preform PMD value does not meet or exceed the predetermined threshold, the preform is removed from the manufacturing process and analyzed for failure causes (act 306). However, if the threshold is met, a histogram may be generated relating to the measured PMD value(s) (act 308). The manufacturing process may then continue through the fiber draw stage to the drum stage as described above (act 310).

Once the manufactured fiber is wound onto a drum, a PMD measurement may again be made using any suitable method (act 312). At this point, it is determined whether the measured PMD meets or exceeds a predetermined threshold (act 314). It should be understood that the threshold of act 314 may differ from that of act 304 depending upon the expected PMD value. If the drum stage PMD value does not meet or exceed the predetermined threshold, a histogram may be created and the fiber may be removed from the manufacturing process and analyzed for failure causes (act 316). As described in detail above, PMD measuring techniques may generate a number of sample measurements that may be collected in a distribution or histogram. A mean value for the histogram may represent a measured PMD for the fiber. A predetermined confidence interval surrounding the mean may define the threshold of acceptable fibers. Also, the shape of the histogram and its change may be used as an indicator. In addition, the histograms generated for each stage may also be analyzed to identify manufacturing or cabling process or equipment issues which may manifest themselves in unusual distributions.

If the threshold is met, another histogram may be generated relating to the measured PMD value(s) (act 318). The process then continues to a cutting stage, where the fiber is cut to appropriate shipping lengths (e.g., 8-20 km) (act 320).

Once the manufactured fiber has been cut to its shipping length, another PMD measurement is made (act 322). At this point, it is determined whether the measured PMD meets or exceeds a predetermined threshold (act 324). As above, the threshold of act 324 may differ from that of acts 304 and/or 314 depending upon the expected PMD value. If the cutting stage PMD value does not meet or exceed the predetermined threshold, the fiber may be removed from the shipping/installation process and analyzed for failure causes (act 326). Alternatively, the fiber may be re-measured. If the threshold is met, a histogram is created relating to the PMD values measured in act 324 (act 328). The process may continue to a packaging/shipping stage, where the fiber is cut to appropriate shipping lengths and packaged for delivery (act 330).

Once the fiber has been delivered, another set of PMD measurements is made (act 332). At this point, it is determined whether the measured PMD meets or exceeds a predetermined threshold (which may again be different from thresholds identified above) (act 334). If the incoming fiber PMD value does not meet or exceed the predetermined threshold, the fiber is re-measured to determine a cause for the failure (act 336). In one implementation, a per fiber correlation may be generated in comparison to the measurements at the packing/shipping stage. If the threshold is met, a histogram may be created relating to the PMD values measured in act 332 (act 338). The process may continue to a loose tubes stage, wherein the fiber has been installed into bundles in loose tubes (act 340).

Once in loose tubes, another set of PMD measurements is made (act 342). At this point, it is again determined whether the measured PMD meets or exceeds a predetermined threshold (which may be the same or different from previously tested thresholds) (act 344). If the incoming fiber PMD value does not meet or exceed the predetermined threshold, the fiber may be re-measured to determine a cause for the failure (act 346). However, if the threshold is met, a histogram may be created relating to the PMD values measured in act 342 (act 348). The process may continue to a stranding stage, where the fiber is stranded into a core cable (act 350).

Once stranded into a core cable, another set of PMD measurements is made (act 352). At this point, it is again determined whether the measured PMD meets or exceeds a predetermined threshold (which may be different or the same as the various thresholds identified above) (act 354). If the incoming fiber PMD value does not meet or exceed the predetermined threshold, the fiber may be re-measured to determine a cause for the failure (act 356). However, if the threshold is met, a histogram may be created relating to the PMD values measured in act 352 (act 358). The process may continue to a cabling stage, where the fiber is finally cabled (act 360) (FIG. 3b).

Once cabled, another set of PMD measurements is made (act 362). At this point, it is again determined whether the measured PMD meets or exceeds a predetermined threshold (which may be different or the same as the various thresholds identified above) (act 364). If the incoming fiber PMD value does not meet or exceed the predetermined threshold, the fiber may be re-measured to determine a cause for the failure (act 366). However, if the threshold is met, a histogram may be created relating to the PMD values measured in act 362 (act 368). The process may continue to a shipping reel stage, where the fiber cables are mounted on shipping reels (act 370).

Once mounted on shipping reels, another set of PMD measurements is made for the cabled fiber (act 372). At this point, it is again determined whether the measured PMD meets or exceeds a predetermined threshold (which may be different or the same as the various thresholds identified above) (act 374). If the incoming fiber PMD value does not meet or exceed the predetermined threshold, the fiber may be re-measured to determine a cause for the failure (act 376). However, if the threshold is met, a histogram may be created relating to the PMD values measured in act 372 (act 378). The process may continue to a shipped reel field measurement stage, where the shipped reels are measured in the field (act 380).

Once the shipping reels are in the field, another set of PMD measurements is made (act 382). At this point, it is again determined whether the measured PMD meets or exceeds a predetermined threshold (which may be different or the same as the various thresholds identified above) (act 384). If the incoming fiber PMD value does not meet or exceed the predetermined threshold, the fiber may be re-measured to determine a cause for the failure (act 386). However, if the threshold is met, a histogram may be created relating to the PMD values measured in act 382 (act 388). The process may continue to a pre-splicing installed stage, where the shipped reels are measured in the field (act 390).

Once installed prior to splicing, another set of PMD measurements is made for the pre-spliced cable (act 392). At this point, it is again determined whether the measured PMD meets or exceeds a predetermined threshold (which may be different or the same as the various thresholds identified above) (act 394). If the incoming fiber PMD value does not meet or exceed the predetermined threshold, the fiber may be re-measured to determine a cause for the failure (act 396). However, if the threshold is met, a histogram may be created relating to the PMD values measured in act 392 (act 398). The process continues to a spliced installed stage, wherein the fiber cables are installed and spliced in the field (act 400).

Once the fiber has been installed and spliced, another set of PMD measurements may be made for the cable (act 402). At this point, it is again determined whether the measured PMD meets or exceeds a predetermined threshold (which may be different or the same as the various thresholds identified above) (act 404). If the incoming fiber PMD value does not meet or exceed the predetermined threshold, the fiber may be re-measured to determine a cause for the failure (act 406). However, if the threshold is met, a histogram may be created relating to the PMD values measured in act 402 (act 408). The installation process is then complete and continues to post-install stage (act 410).

Once the fiber has been completely installed, another final set of PMD measurements is made for the cable (act 412). In practice, this may require determination of a cable's Link Design Value (LDV), which is generally defined as the 99.99 percentile of the PMD coefficient of the concatenation of 20 cable sections that could be randomly drawn from the process distribution.

At this point, it is again determined whether the measured PMD (or LDV) meets or exceeds a predetermined threshold (act 414). If the PMD value does not meet or exceed the predetermined threshold, the cable is re-measured to determine a cause for the failure (act 416). However, if the threshold is met, a histogram is created relating to the PMD values measured in act 412 (act 418).

Once PMD measurements for at least two stages have been conducted, a correlation between the two stages may be identified. For example, in accordance with the present implementation, a correlation coefficient (r) may be identified (e.g., by the Pearson correlation coefficient method described above) between PMD measurements made during the preform stage (act 302) and the PMD measurements made during the drum stage (act 312) (act 420) (FIG. 3c). This coefficient may indicate a predictable shift in PMD between the stages. Additionally, correlation coefficients may be identified between: the cutting stage and the packaging/shipping stage (act 422); the incoming fiber stage and the loose tubes stage (act 424); the loose tubes stage and the core cable stage (act 426); the cabling stage and the shipping reel stage (act 428); the shipped reel in the field stage and the pre-splicing installed stage (act 430); and the spliced installed stage and the final installed stage (act 432).

Although specific stage combinations have been set forth above, it should be understood that any combination of measurement stages may be employed to generate the correlation coefficients. For example, a correlation coefficient may be generated using PMD measurements from loose tubes stage and the PMD measurements from the final spliced installed stage. In this manner, specific indications of stage correlation in relation to PMD fluctuations may be ascertained. For example, measurements at the incoming fiber stage and the pre-splicing installed stage may indicate a strong correlation. Additionally, as described above, regression equations may also be generated for each set of stages, illustrating expected values of PMD for each stage relative to another. Furthermore, it should be understood that correlations may be performed for more than two stages resulting in multi-dimensional correlations. Correlation coefficients between the various stages are then combined to generate a generic correlation coefficient for the entire process (act 434).

Figure 4:
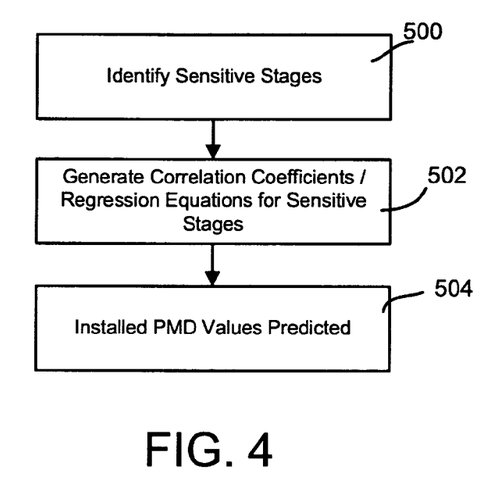
FIG. 4 is an exemplary flow diagram, consistent with the present invention, illustrating one method for providing PMD prediction.

FIG. 4 is an exemplary flow diagram, consistent with the present invention, illustrating one method for predicting PMD for installed fiber applications. Initially, the various histograms, correlation coefficients and regression equations generated in FIGS. 3a-3c may be analyzed (hereinafter the "sensitivity analysis") to identify those stages having the greatest sensitivity regarding their effect on installed PMD for the bundled fiber (act 500). In this manner, measurements and correlations for non-sensitive stages may be minimized, thereby enhancing the efficiency of the PMD prediction process. Additionally, by reducing the number of less sensitive measurements included within the analysis, scatter is effectively reduced, thereby enhancing the accuracy and reliability of any prediction generated. In accordance with one implementation of the invention, the sensitivity analysis may be based on various quantifiable criteria, such as changes to PMD histograms (and/or histogram shapes) from each stage, value of correlation coefficients associated with the stage, relative fluctuation in linear regression equations generated for the stage, etc.

Once a sensitive stage or stages has been identified, correlation coefficients and/or regression equations between the identified stages are generated (act 502). Once the correlations and/or equations of act 502 have been identified, installed PMD values may be predicted for fibers/cables throughout the manufacturing/installation process (act 504).

As described above, by measuring PMD values at a plurality of stages throughout the cable manufacturing and installation process, correlations between the measurements may be made and used to more accurately predict which cables will perform within specifications when installed in the field from an earlier stage of manufacture/installation.

CONCLUSION

Implementations consistent with the principles of the invention provide organizations with an efficient and effective process for performing performance parameter control and analysis. More particularly, in one implementation consistent with principles of the invention, measured PMD values may be correlated at various times throughout the optical fiber manufacturing process to enable predicted PMD values for installed cable. Additionally, although the above description explicitly discusses PMD as the measure performance parameter, it should be understood that the instant methodology may be applicable to numerous optical fiber performance parameters, such as the entire spectral insertion loss (O-L bands), especially at the micro bending edge (1565 nm), attenuation, dispersion, and any other pertinent measured (or unmeasured) fiber parameter and other such parameters which are difficult to track through optical fiber and cable the manufacturing process.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while series of acts have been described with regard to FIGS. 3a, 3b, 3c, and 4 the order of the acts may be varied in other implementations consistent with the present invention. In addition, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method for predicting an optical fiber performance parameter, comprising:
   measuring N values for the optical fiber performance parameter at N stages during manufacture or installation of a first optical fiber, where N is an integer;
   generating a first set of correlation values representing shifts in the measured optical fiber performance parameter values at the N stages; and
   predicting an installed value of the optical fiber performance parameter for a second optical fiber based on the first set of generated correlation values and at least one measured optical fiber performance parameter value associated with the second optical fiber.

2. The method of claim 1, wherein the N stages during manufacture or installation of the first optical fiber comprise N stages at different moments in time.

3. The method of claim 1, where the optical fiber performance parameter comprises polarization mode dispersion (PMD).

4. The method of claim 3, wherein the PMD parameter is measured using one of: a Jones Matrix Eigenanalysis (JME) method, a wavelength scanning method, or an interferometric method.

5. The method of claim 1, wherein the first set of correlation values comprises a first set of N correlation coefficients.

6. The method of claim 5, wherein the first set of N correlation coefficients comprises a first set of N Pearson Product Moment correlation coefficients.

7. The method of claim 6, further comprising:
calculating a square of each of the first set of N Pearson Product Moment correlation coefficients to determine a proportion of variance of the respective measurement explained by a preceding measurement.

8. The method of claim 1, further comprising:
calculating a linear regression based on the first set of correlation values; and
determining a goodness of fit of the linear regression to evaluate a manufacturing or installation process.

9. The method of claim 8, further comprising:
predicting the installed value of the optical fiber performance parameter for the second optical fiber based on the linear regression.

10. The method of claim 1, further comprising:
identifying sensitive stages from the N stages based on the first set of generated correlation values;
generating a second set of correlation values based on the identified sensitive stages; and
predicting the installed value of the optical fiber performance parameter for the second optical fiber based on the second set of generated correlation values and the at least one measured optical fiber performance parameter value associated with the second optical fiber.

11. The method of claim 1, wherein the first set of correlation values includes multi-dimensional correlations based on three or more optical fiber performance parameter values measured at three or more stages.

12. The method of claim 1, further comprising:
generating a generic correlation value based on the first set of correlation values; and
estimating the value of the optical fiber performance parameter at an $m^{th}$ moment in time based upon the generic correlation, where m is an arbitrary integer.

13. The method of claim 1, further comprising:
determining whether any of the N values of the optical fiber performance parameter meet or exceed N predetermined thresholds;
discarding the first optical fiber when any of the N values of the optical fiber performance parameter meet or exceed the N predetermined thresholds; and
analyzing the first optical fiber to determine a cause for failure.

14. The method of claim 1, wherein the first set of correlation values are based on observations of a manner in which the optical fiber performance parameter varies over time.

15. A method for predicting an optical fiber performance parameter, comprising:
measuring N values for the optical fiber performance parameter at N stages during manufacture or installation of a first optical fiber, where N is an integer;
generating a first set of correlation values representing shifts in the measured optical fiber performance parameter values at the N stages; and
predicting a value of the optical fiber performance parameter for a second optical fiber at any stage during manufacture or installation of the second optical fiber based on the first set of generated correlation values.

16. The method of claim 15, wherein the optical fiber performance parameter comprises polarization mode dispersion (PMD).

17. The method of claim 15, wherein the N stages during manufacture or installation of the first optical fiber comprise N stages at different moments in time.

18. The method of claim 15, further comprising:
calculating a linear regression based on the first set of correlation values; and
predicting the value of the optical fiber performance parameter for the second optical fiber based on the linear regression.

19. A method for predicting a value of a performance parameter, comprising:
measuring N values for the performance parameter at N stages during manufacture or installation of a device, where N is an integer;
generating a first set of correlation values representing shifts in the measured performance parameter values at the N stages; and
predicting another value of the performance parameter for a second device based on the first set of generated correlation values and at least one measured value of the performance parameter associated with the second device.

20. The method of claim 19, further comprising:
calculating a linear regression based on the first set of correlation values;
determining a goodness of fit of the linear regression to evaluate a manufacturing or installation process; and
predicting the other value of the performance parameter for the second device based on the linear regression.

* * * * *